United States Patent [19]

Funahashi et al.

[11] Patent Number: 4,941,649
[45] Date of Patent: Jul. 17, 1990

[54] FLUID-FILLED CYLINDRICAL ELASTIC MOUNT HAVING MEANS FOR IMPROVED DURABILITY OF ELASTIC BODY

[75] Inventors: Yoshiki Funahashi, Iwakura; Masayuki Hibi, Komaki, both of Japan

[73] Assignee: Tokai Rubber Industries, Ltd., Japan

[21] Appl. No.: 220,317

[22] Filed: Jul. 18, 1988

[51] Int. Cl.$^5$ ............................................... F16F 5/00
[52] U.S. Cl. .................................. 267/140.1; 267/219
[58] Field of Search .............. 248/562; 267/219, 140.1

[56] References Cited

U.S. PATENT DOCUMENTS

| | | | |
|---|---|---|---|
| 4,717,111 | 1/1988 | Saito ................................. | 267/140.1 |
| 4,728,086 | 3/1988 | Ishiyama et al. .................. | 267/140.1 |
| 4,756,514 | 7/1988 | Kanda ............................... | 267/140.1 |

FOREIGN PATENT DOCUMENTS

| | | | |
|---|---|---|---|
| 0037348 | 2/1984 | Japan ................................ | 267/140.1 |
| 0261730 | 11/1987 | Japan ................................ | 267/140.1 |
| 261731 | 11/1987 | Japan . | |

Primary Examiner—Duane A. Reger
Attorney, Agent, or Firm—Oliff & Berridge

[57] ABSTRACT

A fluid-filled cylindrical elastic mount for flexible coupling of two members, including an elastic body which is interposed between an inner and an outer sleeve for elastic connection therebetween and which has a pressure-receiving chamber filled with a non-compressible fluid and communicating with an equilibrium chamber through a restricted passage. The elastic body has a portion defining a void formed therethrough in an axial direction of the elastic mount. The void is positioned between the pressure-receiving chamber and one of the inner and outer sleeves, as viewed in a load-receiving direction in which the elastic body is compressed when the elastic mount is attached to the two members.

10 Claims, 2 Drawing Sheets

FLUID-FILLED CYLINDRICAL ELASTIC MOUNT HAVING MEANS FOR IMPROVED DURABILITY OF ELASTIC BODY

BACKGROUND OF THE INVENTION

1. Field of the Invention

The present invention relates in general to a fluid-filled cylindrical elastic mount used, for example, for mounting an engine of a front-engine front-drive motor vehicle, and more particularly to such an elastic mount which is improved in durability.

2. Discussion of the Prior Art

There is known a fluid-filled cylindrical elastic mount for damping radially applied vibrations in a certain frequency range, based on resonance of a mass of a non-compressible fluid existing in a restricted passage which communicates with a plurality of fluid chambers defined between an inner and an outer sleeve which are elastically connected to each other by an elastic body interposed therebetween. For instance, such a fluid-filled cylindrical elastic mount is used for flexibly supporting a power unit of a front-engine front-drive vehicle including an engine and a transmission, so that the body of the vehicle is isolated from vibrations of the power unit.

An example of the known fluid-filled cylindrical elastic mount of the type indicated above includes a cylindrical elastic body which elastically connects the inner and outer sleeves and which has a plurality of pressure-receiving fluid chambers formed therein so as to communicate with each other through a restricted passage. In the elastic mount having this construction, however, a part of the cylindrical elastic body is inevitably subjected to a tensile force while the elastic mount is in its operating state, namely, while the weight of a member to be supported, such as a power unit of the vehicle, acts on the elastic mount. Therefore, the elastic body of the known elastic mount tends to suffer from relatively low durability, resulting in accordingly low durability of the elastic mount. This means that the known elastic mount discussed above is not suitable as a mounting device which is permanently subjected to the weight of a certain load member such as the vehicle power unit indicated above.

Recently, there has been proposed an improved fluid-filled cylindrical elastic mount which includes (a) an inner sleeve, (b) an outer sleeve disposed outwardly of the inner sleeve, (c) an elastic body interposed between the inner and outer sleeves and having a pressure-receiving chamber filled with a non-compressible fluid, (d) means for defining an equilibrium chamber also filled with the non-compressible fluid, and (e) means for defining a restricted passage for restricted fluid communication or flow between the pressure-receiving and equilibrium chambers.

In the elastic mount constructed as described above wherein the equilibrium chamber communicating with the pressure-receiving chamber through the restricted passage is partially defined by the elastic wall, the elastic body need not be a cylindrical one and is therefore less likely to be subject to the tensile force due to the weight of a member to be supported. Thus, the instant arrangement prevents considerable reduction in the durability of the elastic mount in its operating state, providing an improvement in the durability of the elastic mount itself.

Although the improved fluid-filled cylindrical elastic mount indicated just above is less likely to be subjected to a tensile force due to the weight of a load member, the side wall portions of the elastic body which define the axial ends of the pressure-receiving chamber tend to have a considerably large compressive strain due to the weight of the load member, particularly when an applied vibrational load having a large amplitude is added to the weight of the load member. Such a compressive strain causes a decrease in the durability of the elastic body and the elastic mount.

SUMMARY OF THE INVENTION

It is accordingly an object of the present invention to provide a fluid-filled cylindrical elastic mount for flexible coupling of two members, which elastic mount has improved durability of an elastic body incorporated therein.

The above object may be achieved according to the principle of the present invention, which provides a fluid-filled cylindrical elastic mount for flexible coupling of two members, comprising: (a) an inner sleeve; (b) an outer sleeve disposed outwardly of the inner sleeve; (c) an elastic body interposed between the inner and outer sleeves for elastic connection therebeween, the elastic body having a pressure-receiving chamber filled with a non-compressible fluid; (d) means for defining an equilibrium chamber filled with the non-compressible fluid, the means including an elastic wall; (e) means for defining a restricted passage for restricted fluid communication between the pressure-receiving chamber and the equilibrium chamber. The elastic body has a portion defining a void formed therethrough in an axial direction of the elastic mount. The void is positioned between the pressure-receiving chamber and one of the inner and outer sleeves, as viewed in a load-receiving direction in which the elastic body is compressed when the elastic mount is attached to the two members.

In the fluid-filled cylindrical elastic mount of the present invention constructed as described above, the side wall portions defining the axial ends of the pressure-receiving chamber are subjected to a compressive load or force only after the portion defining the void is elastically deformed such that the volume of the void is reduced. According to this arrangement, the compressive load which exerts on the side wall portions is reduced by an amount which initially acts to elastically deform the void, whereby the compressive strain of the side wall portions is accordingly reduced.

Preferably, the void is shaped and dimensioned so that the void disappears due to elastic deformation of the elastic body upon application of a load to the elastic mount in the load-receiving direction.

According to the invention, therefore, the amount of compressive strain of the side wall portions of the elastic body which define the axial ends of the pressure-receiving chamber is significantly reduced as compared with that in the known fluid-filled cylindrical elastic mount. Consequently, the durability of the elastic body and the elastic mount against the compressive load can be considerably improved, as well as the elastic mount is protected from a tensile force due to the weight of the member which acts on the elastic mount. That is, the life expectancy of the elastic mount installed in place under the load can be accordingly elongated.

The pressure-receiving chamber may be divided by a portion of the elastic body into two separate parts.

The void and the equilibrium chamber may be disposed on diametrically opposite sides of the inner sleeve, as viewed in the load-receiving direction. In this case, the elastic body may further has a second void formed therethrough in the axial direction, in addition to the void indicated above which serves as a first void.

The pressure-receiving chamber may have a restricted portion which provides a resistance to a flow of the non-compressible fluid from one part of the pressure-receiving chamber to another. In this instance, the elastic mount may further comprise a resonance member exposed to the pressure-receiving chamber for damping vibrations applied to the elastic mount. The resonance member may be adapted to partially define the restricted portion of the pressure-receiving chamber.

The instant elastic mount may further comprise a cylindrical passage-defining member which is disposed between the outer sleeve and the elastic body, such that the passage-defining member is fitted in a circumferential recess formed in the outer circumferential surface of the elastic body. The passage-defining member cooperates with the outer sleeve to define the restricted passage which communicates with the pressure-receiving chamber and the equilibrium chamber.

BRIEF DESCRIPTION OF THE DRAWINGS

The above and other objects, features and advantages of the present invention will become more apparent by reading the following detailed description of presently preferred embodiments of the invention, when considered in conjunction with the accompanying drawings, in which.

DETAILED DESCRIPTION OF THE PREFERRED EMBODIMENTS

Figure 1:
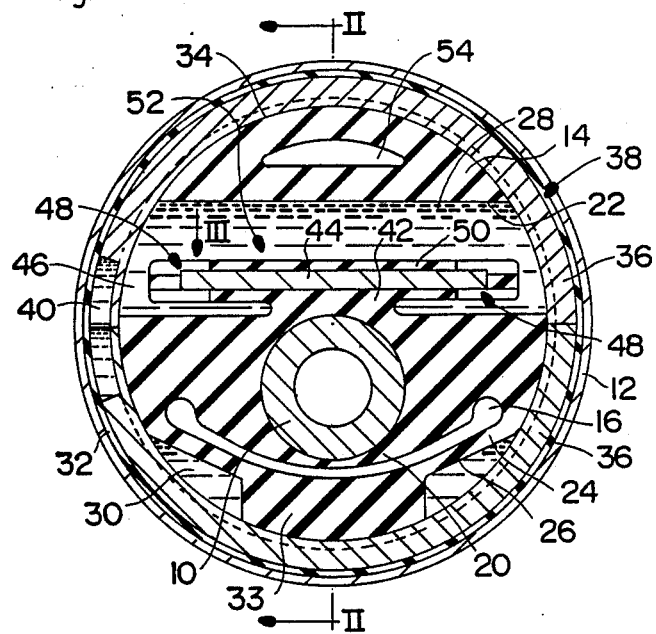
FIG. 1 is an elevational view in transverse cross section of one embodiment of a fluid-filled cylindrical elastic mount of the invention, taken along line I—I of FIG. 2.
Figure 2:
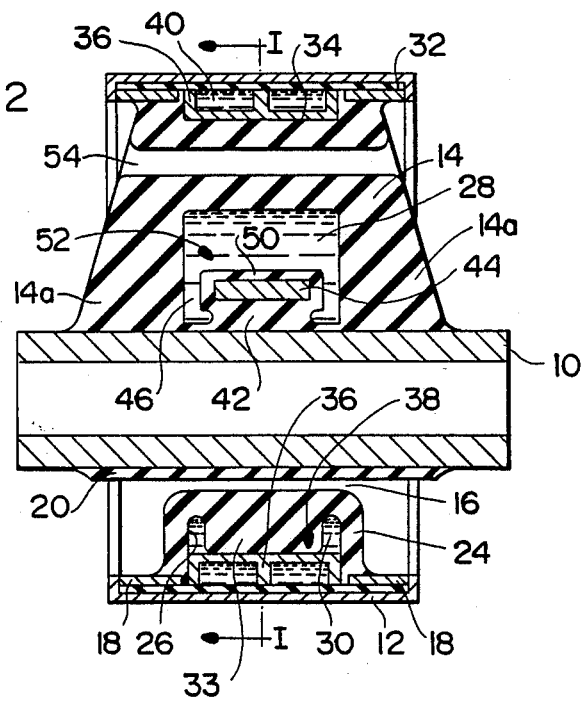
FIG. 2 is an elevational view in axial cross section of the elastic mount of FIG. 1, taken along line II—II of FIG. 1.

Referring to FIGS. 1 and 2, there is shown the first embodiment of the fluid-filled cylindrical elastic mount of the invention in the form of a cylindrical engine mount for a front-engine front-drive motor vehicle. It will be understood that the elastic mount according to the invention may be used for other applications.

In FIGS. 1 and 2, reference numerals 10 and 12 respectively denote an inner sleeve, and an outer sleeve disposed outwardly of the inner sleeve such that the two sleeves are eccentric with each other by a predetermined amount in a diametrical direction of the engine mount. These inner and outer sleeves 10, 12 are elastically connected to each other by a generally semi-cylindrical elastic member 14 of a rubber material interposed therebetweeen. The inner sleeve 10 is attached to one of a power unit and a body of the vehicle, while the outer sleeve is attached to the other of the power unit and the vehicle body. Thus, the power unit is mounted on the vehicle body via the engine mount, so as to damp and absorb vibrations.

A substantial portion of the elastic member 14 is interposed on one of opposite diametrical sides of the inner sleeve 10 on which the distance between the center of the inner sleeve 10 and the circumference of the outer sleeve 12 is larger than that on the other side, as viewed in the direction in which the inner sleeve 10 is offset from the center of the outer sleeve 12. On the other side of the inner sleeve 10, there is formed a first void 16 which extends over a substantially entire length of the elastic member 14 in the axial direction of the engine mount. As shown in FIG. 1, the first void 16 has a substantially arcuate shape as viewed in transverse cross section of the engine mount. The elastic member 14 is adapted to be elastically compressed between the inner and outer sleeves 10, 12 in a load-receiving direction of the engine mount, so that the two sleeves 10 and 12 are held in substantially concentric or coaxial relationship with each other, with the weight of the power unit of the vehicle applied to the engine mount, i.e., while the engine mount is installed in place on the vehicle for flexible connection of the power unit to the vehicle body.

The elastic member 14 is secured to the inner sleeve 10 in a vulcanization process. A pair of sealing sleeves 18, 18 are secured, also in the vulcanization process, to the outer circumferential surface of the elastic member 14, such that the sleeves 18, 18 are fitted on the opposite axial end portions of the elastic member 14. The outer sleeve 12 is fluid tightly fitted on the pair of sealing sleeves 18, 18 via a circumferential sealing rubber layer 32 formed therebetween. As indicated in Figs. 1 and 2, the elastic member 14 has an integrally formed arcuate rubber layer 20 which partially defines the arcuate first void 16. The rubber layer 20 is formed substantially along a part of the circumference of the inner sleeve 10 on the side of the first void 16.

The elastic member 14 has a cavity 22 which is formed perpendicularly to the load-receiving direction of the engine mount (the direction in which the elastic member 4 is compressed) and to the axial direction of the engine mount. The cavity 22 is open to a space defined between the two sealing sleeves 18, 18, and has a substantially rectangular cross sectional shape. An elastic closure 24 is formed integrally with the elastic member 14, so as to form a recess 26 within a portion of the space between the two sealing sleeves 18, 18 which is adjacent to the first void 16. The elastic closure 24 cooperates with the arcuate rubber layer 20 to define the first void 16. The openings of the cavity 22 and recess 26 are fluid tightly closed by the outer sleeve 12 via the sealing rubber layer 32, whereby a pressure-receiving chamber 28 and an equilibrium chamber 30 are formed, respectively. These two chambers 28, 30 are filled with a suitable non-compressible fluid such as water, polyalkylene glycol or silicone oil.

The sealing rubber layer 32 described above is secured to the inner surface of the outer sleeve 12 by vulcanication, to secure the fluid tightness of the chambers 28 and 30. Reference numeral 33 designates a rubber block formed integrally with the elastic closure 24 such that the rubber block 33 extends from the top wall of the closure 24 into the equilibrium chamber 30. The rubber block 33 functions as a stop for limiting a relative displacement of the inner and outer sleeves 10, 12 in the load-receiving direction, when the inner sleeve 10 is moved in the downward direction as seen in FIGS. 1 and 2, which causes the elastic member 14 to be elongated in the load-receiving direction. In the present embodiment, the elastic member 14, elastic closure 24 and rubber block 33 constitute a substantially cylindrical elastic body interposed between the inner and outer sleeves 10, 12.

The elastic member 14 further has a circumferential recess 34 formed in its outer circumferential surface such that the recess 34 is open to the space between the sealing sleeves 18, 18. This circumferential recess 34 communicates with the circumferential ends of the recess 26. In the circumferential recess 34, there is accommodated a cylindrical passage-defining member 38 which consists of a pair of separate semi-cylindrical halves 36, 36. The passage-defining member 38 has a helical groove in its outer circumferential surface. This helical groove is closed by the rubber layer 32, whereby a helical restricted passage 40 is defined. Namely, the pressure-receiving chamber 28 and the equlibrium chamber 30 are held in communication with the restricted passage 40 which is formed between the passage-defining member 38 and the outer sleeve 12 (more precisely, the rubber layer 32). The restricted passage 40 provides a resistance to flows of the non-compressible fluid between the two chambers 28, 30.

More specifically, the restricted passage 40 is adapted to damp input vibrations in a comparatively low frequency range such as engine shake, based on resonance of a mass of the non-compressible fluid existing in the restricted passage.

The elastic member 14 is formed with a rubber support 42 which extends radially outwardly from the inner sleeve 10 into the pressure-receiving chamber 28. To this rubber support 42 is secured by vulcanization a rectangular planar resonance member 44 which has a suitable mass. The resonance member 44 is formed and positioned so as to substantially divide the volume of the pressure-receiving chamber 28 into two sections which are spaced apart from each other in the load-receiving direction of the engine mount. However, the two sections of the chamber 28 communicate with each other through a rectangular annular restricted portion 46 which is formed between the periphery of the resonance member 44 and the cylindrical passage-defining member 38.

When the inner and outer sleeves 10, 12 are displaced toward each other in the load-receiving direction (in which the axes of the two sleeves are offset from each other), the non-compressible fluid can flow from one of the two sections of the pressure-receiving chamber 28 to the other, through the restricted portion 46, in the load-receiving direction. In this instance, input vibrations in a given frequency range are suitably damped or isolated based on resonance of a mass of the non-compressible fluid which exists near the restricted portion 46 of the chamber 28. The frequency range of the vibrations to be damped is determined by the configuration and dimensions of the restricted portion 46. Since the resonance member 44 is elastically connected to the inner sleeve 10, vibrations in a frequency range which includes the natural frequency of the resonance member 44 can be suitably damped or isolated.

In the present embodiment, the restricted portion 46 defined between the resonance member 44 and the passage-defining member 38 is tuned to a comparatively high frequency range of the vibrations to be damped. Consequently, the resonance of the mass of the non-compressible fluid in the restricted portion 46 is effective to damp comparatively high-frequency vibrations such as booming noises of the system. Further, the natural frequency of the resonance member 44 is selected to be higher than the frequency of the vibrations that are damped by the resonance of the fluid in the restricted portion 46. Thus, the comparatively high-frequency vibrations such as sounds transmitted through the vehicle engine can be effectively damped by the resonance of the resonance member 44.

Figure 3:
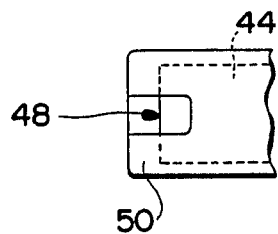
FIG. 3 is a fragmentary view taken in the direction of arrow III of FIG. 1.

As shown in FIGS. 1–3, the resonance member 44 is coated with a covering layer 50 integral with the rubber support 42, except for exposed portions 48 at which the resonance member 44 is gripped during vulcanization of the elastic body (consisting of the elastic member 14 and other rubber elements or portions). It will be understood that the rubber support 42, resonance member 44 and associated elements cooperate with each other to function as a stop 52 which limits a relative displacement of the inner and outer sleeves 10, 12 in the direction in which the elastic member 14 is compressed.

In the fluid-filled cylindrical elastic engine mount constructed as depicted in FIGS. 1 and 2, the elastic member 14 has a crescent second void 54 formed in the axial direction of the engine mount, through a radially outer portion thereof. That is, the second void 54 is formed through a portion of the elastic member 14 which is located between the outer sleeve 12 and the pressure-receiving chamber 28, as viewed in the direction in which the elastic member 14 is compressed. This second void 54 is shaped and dimensioned so that the void 54 substantially completely disappears due to elastic deformation or compression of the elastic member 14 which is caused by the weight of the power unit which acts on the instant engine mount, in the load-receiving direction (in the downward direction as seen in FIGS. 1 and 2).

As indicated above, upon installation of the power unit on the vehicle body via the thus constructed engine mount, the weight of the power unit causes the inner and outer sleeves 10, 12 to be displaced toward each other, thereby elastically compressing the elastic body 14, 24, 33. This elastic deformation occurs initially at the portion of the elastic member 14 which defines the second void 54, so as to cause the void 54 to disappear. Only after the second void 54 disappears with the elastic deformation of the portion of the elastic member 14 near the second void 54, the weight of the power unit begins to act on a pair of side walls 14a, 14a of the elastic member 14 which define the axial ends of the pressure-receiving chamber 28. Therefore, the portion of the weight of the power unit which acts on the side walls 14a, 14a is reduced in the instant engine mount, as compared with that in the conventional elastic mount. Accordingly, the compressive strain of the side walls 14a, 14a is reduced.

In other words, the compressive strain of the side walls 14a, 14a due to the weight of the power unit, which occurs substantialy following the compressive strain that causes the second void 54 to disappear, is considerably small than the compressive strain that is caused in the known engine mount which has not a second void similar to the void 54. Therefore, the durability of the elastic body 4, 24, 33 against a compressive stress or load is significantly improved, and the durability of the engine mount itself is accordingly improved as compared with that of the conventional engine mount.

In addition to the above advantage offered by the provision of the second void 54, the instant engine mount provides an advantage that the tensile force applied to the elastic body 14, 24, 33 due to the weight of the power unit is minimized by the first void 16 formed on the side of the inner sleeve 10 remote from the second void 54, and by the equilibrium chamber 30 formed by the elastic closure 24. These two features are combined to increase the life expectancy of the engine mount to an appreciable extent.

When vibrations are applied to the instant engine mount in the load-receiving direction in which the centers of the inner and outer sleeves 10, 12 are offset from each other, the non-compressible fluid flows between the pressure-receiving and equilibrium chambers 28, 30 through the restricted passage 40, whereby the comparatively low-frequency vibrations such as the engine shake can be damped based on the resonance of the mass of the fluid in the restricted passage 40. Simultaneously, the fluid flows between the two sections of the pressure-receiving chamber 28 through the restricted portion 46 defined by the outer periphery of the resonance member 44 and the passage-defining member 38, whereby the comparatively high-frequency vibrations such as the booming noises can be damped based on the resonance of the mass of the fluid in the restricted portion 46. Further, the vibrations in a still higher frequency range such as the engine-transmitted sound can be isolated based on the resonance of the resonance member 44 within the pressure-receiving chamber 28.

It follows from the above description that the instant engine mount is capable of damping or isolating the vertically applied vibrations in a comparatively wide frequency range, not only based on the resonance of the fluid mass flowing through the restricted passage 40, but also based on the resonance of the fluid mass flowing through the restricted portion 46 of the chamber 28 and on the resonance of the resonance member 44.

While one presently preferred embodiment of the present invention has been described for illustrative purpose only, it is to be understood that the invention is not limited to the details of the illustrated embodiment, but the invention may be otherwise embodied.

In the illustrated embodiment shown in FIGS. 1–3, the second void 54 which disappears upon mounting of the power unit on the vehicle body via the engine mount is formed in a portion of the elastic member 14 between the pressure-receiving chamber 28 and the outer sleeve 12, as viewed in the load-receiving direction. However, such a second void may be formed in a portion of the elastic member 14 between the pressure-receiving chamber 28 and the inner sleeve 10. Further, two second voids may be formed in the above-indicated two portions of the elastic member 14.

Figure 4:
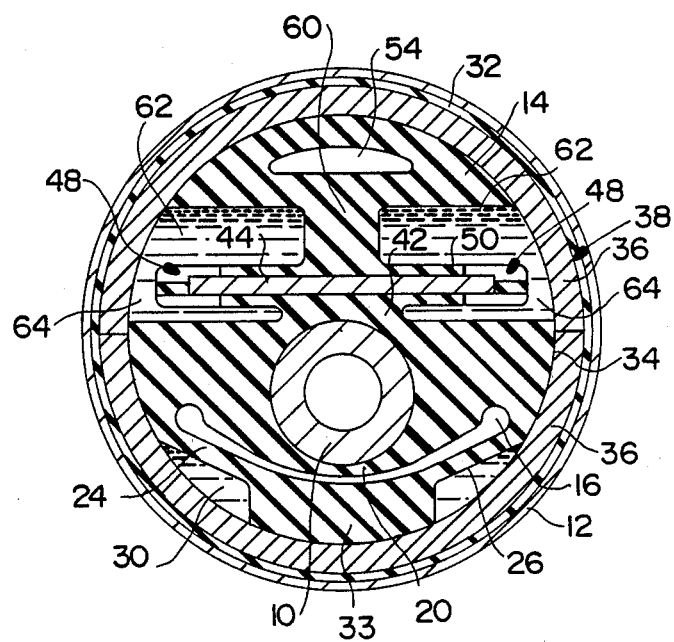
FIG. 4 is an elevational cross sectional view corresponding to that of FIG. 1, showing another embodiment of the present invention.

In the illustrated engine mount, the elastic member 14 has only one pressure-receiving chamber, i.e., chamber 28. However, the elastic member of the elastic mount according to the principle of this invention may have two or more pressure-receiving chambers. An example of such a modification of the invention is shown in FIG. 4. In the modified engine mount of FIG. 4, the elastic member 14 has two pressure-receiving chambers 62, 62 which are separated from each other by a partition rubber wall 60 which is disposed between the second void 54 and a central part of the resonance member 44. As in the first embodiment of FIGS. 1–3, these two chambers 62, 62 are held in communication with the equilibrium chamber 30, through a restricted passage (not shown). Each of the two pressure-receiving chambers 62, 62 has a generally U-shaped restricted portion 64 defined by the outer periphery of the resonance member 44 and the appropriate part of the inner surface of the passage-defining member 38.

Although the resonance member 44 provided in the illustrated two embodiments functions as a damping member having a predetermined natural frequency, as well as a planar member for defining the restricted portion 46 or restricted portions 64, the damping function of the member 44 is not essential to practicing the principle of the present invention. In this case, a suitable planar member may be fixed to the inner sleeve 10, or such a member may be eliminated.

It will be obvious that the present invention may be embodied with various other changes, modifications and improvements, which may occur to those skilled in the art, without departing from the spirit and scope of the invention defined in the following claims.

What is claimed is:

1. A fluid-filled cylindrical elastic mount for flexible coupling of two members, comprising:
    an inner sleeve;
    an outer sleeve disposed outwardly of said inner sleeve;
    an elastic body interposed between said inner and outer sleeves for elastic connection therebetween, said elastic body having a pressure-receiving chamber filled with a non-compressible fluid;
    means for defining an equilibrium chamber filled with said non-compressible fluid, said means including an elastic wall;
    means for defining a restricted passage for restricted fluid communication between said pressure-receiving chamber and said equilibrium chamber; and
    said elastic body having a portion defining a void formed therethrough in an axial direction of said elastic mount, said void and said pressure-receiving chamber being positioned between said inner and outer sleeves, as viewed in a load-receiving direction in which said elastic body is compressed when said elastic mount is attached to said two members, such that said void is positioned between said pressure-receiving chamber and one of said inner and outer sleeves in said load-receiving direction.

2. A fluid-filled cylindrical elastic mount according to claim 1, wherein said void is shaped and dimensioned so that said void disappears due to elastic deformation of said elastic body upon application of a load to said elastic mount in said load-receiving direction.

3. A fluid-filled cylindrical elastic mount according to claim 1, wherein said void is positioned between said pressure-receiving chamber and said outer sleeve as viewed in said load-receiving direction.

4. A fluid-filled cylindrical elastic mount according to claim 1, wherein said pressure-receiving chamber is divided by a portion of said elastic body into two separate parts.

5. A fluid-filled cylindrical elastic mount according to claim 1, wherein said void and said equilibrium chamber are disposed on diametrically opposite sides of said inner sleeve, as viewed in said load-receiving direction.

6. A fluid-filled cylindrical elastic mount according to claim 5, wherein said void serves as a first void, and said elastic body further includes a portion for defining a second void formed therethrough in said axial direction.

7. A fluid-filled cylindrical elastic mount according to claim 1, wherein said pressure-receiving chamber has a restricted portion which provides a resistance to a flow of said non-compressible fluid from one part of said pressure-receiving chamber to another.

8. A fluid-filled cylindrical elastic mount according to claim 7, further comprising a resonance member exposed to said pressure-receiving chamber for damping vibrations applied to said elastic mount.

9. A fluid-filled cylindrical elastic mount according to claim 8, wherein said resonance member partially defines said restricted portion of said pressure-receiving chamber.

10. A fluid-filled cylindrical elastic mount according to claim 1, further comprising a cylindrical passage-defining member disposed between said outer sleeve and said elastic body, and wherein said elastic body has a circumferential recess in an outer circumferential surface thereof, said passage-defining member being fitted in said circumferential recess, and cooperating with said outer sleeve to define said restricted passage which communicates with said pressure-receiving chamber and said equilibrium chamber.

* * * * *